United States Patent
Oi et al.

[19]

[11] Patent Number: 6,154,927
[45] Date of Patent: Dec. 5, 2000

[54] HINGE

[75] Inventors: Shigeo Oi; Shinichi Yamaguchi, both of Aichi; Morihito Sawai, Tokyo; Takahiro Mizuno, Kariya, all of Japan

[73] Assignees: Togo Seisakusyo Corp., Aichi-Ken; Nippon Stud Welding Co., Ltd., Tokyo, both of Japan

[21] Appl. No.: 09/038,624

[22] Filed: Mar. 12, 1998

[30] Foreign Application Priority Data

Mar. 14, 1997 [JP] Japan .................................... 9-060462

[51] Int. Cl.$^7$ ............................... E05D 5/10; E05C 17/64
[52] U.S. Cl. ................................................ 16/386; 16/342
[58] Field of Search .......................... 16/342, 336, 337, 16/339, 340, 334, 386, 297, 300, 319, 50; 403/93, 94, 97; 24/543, 336, 329

[56] References Cited

U.S. PATENT DOCUMENTS

| | | | |
|---|---|---|---|
| 4,089,087 | 5/1978 | Heitman | 24/329 |
| 5,109,572 | 5/1992 | Park | 16/334 |
| 5,190,390 | 3/1993 | Ming | 16/334 |
| 5,363,539 | 11/1994 | Tisol | 24/543 |
| 5,613,275 | 3/1997 | Kolberg et al. | 16/342 |
| 5,765,263 | 6/1998 | Bolinas et al. | 16/342 |

FOREIGN PATENT DOCUMENTS

| | | | |
|---|---|---|---|
| 4023978 | 1/1992 | Germany | 16/342 |
| 5-54881 | 7/1993 | Japan . | |
| 6-28313 | 4/1994 | Japan . | |
| 2132261 | 7/1984 | United Kingdom | 16/386 |

*Primary Examiner*—Chuck Y. Mah
*Attorney, Agent, or Firm*—Wenderoth, Lind & Ponack, L.L.P.

[57] ABSTRACT

A hinge suitable for use in tube clamps for tubing in automobiles includes two members rotatably connected together. A pair of pin shafts protrude from either one of the two members, each pin shaft having an outer wall. A pair of support holes are formed in the other member, the pin shafts being inserted into the respective support holes so that the two members are rotatable relative to each other. Each support hole has a peripheral wall, a plurality of abutment portions protruding from either one of the peripheral wall of each support hole or each pin shaft. A plurality of escape recesses are formed in the other of the peripheral wall of each support hole and each pin shaft so as to locationally correspond to the respective abutment portions. When the pin shafts are inserted into the respective support holes, an alignment position is provided at which the abutment portions and the escape recesses are aligned with each other so that a clearance is defined between an entire circumference of each pin shaft and the corresponding escape recess, and an abutment position is provided at which the two members are rotated relative to each other from the alignment position by a predetermined angle so that at least two of the abutment portions are abutted against the peripheral wall of each support hole or the outer wall of each pin shaft.

10 Claims, 8 Drawing Sheets

HINGE

BACKGROUND OF THE INVENTION

1. Field of the Invention

This invention relates to a hinge in which a pair of pin shafts protruding from one of two members are inserted into support holes formed in the other member so that the two members are rotatably connected together, and more particularly to such a hinge suitable for use in tube clamps made for tubing in automobiles.

2. Description of the Prior Art

FIGS. 8 and 9 illustrate a conventional resin tube clamp for holding tubes used for tubing in automobiles. The shown tube clamp comprises a clamp body 50 and a presser lid 51. The clamp body 50 has a pair of horizontally extending pin shafts 52. The presser lid 51 has a pair of support holes 53 receiving the pin shafts 52. In order that a tube T may be held by the tube clamp, the tube T is inserted into a holding groove 54 of the clamp body 50. The presser lid 51 is then closed so that the tube T is pressed by a pressing piece 55 thereof. A claw 56A of the presser lid 51 is engaged with a claw 56B of the clamp body 50. Thus, the tube T is held by the tube clamp.

The clamp body 50 and the presser lid 51 are simultaneously formed with the pin shafts 52 being combined with or inserted in the respective support holes 53. As a result of this forming, a step of combining the independently formed clamp body 50 and presser lid 51 together is eliminated such that the manufacturing efficiency can be improved. In this forming manner, a suitable clearance needs to be ensured between each pin shaft 52 and the corresponding support hole 53 over an entire circumference of each pin shaft. However, the pin shafts 52 cannot be closely assembled into the respective support holes 53 when the clearance is provided around the pin shafts 52. The clearance results in the shaking of the pin shafts 52 when the presser lid 51 is opened and closed. Consequently, the tube T cannot be stably held by the tube clamp. This poses a problem.

SUMMARY OF THE INVENTION

Therefore, an object of the present invention is to provide a hinge which can prevent the pin shafts from shaking.

To accomplish the object, the present invention provides a hinge which includes two members rotatably connected together, comprising a pair of pin shafts protruding from either one of the two members, each pin shaft having an outer wall, a pair of support holes formed in the other member, the pin shafts being inserted into the respective support holes so that the two members are rotatable relative to each other, each support hole having a peripheral wall, a plurality of abutment portions protruding from either one of the peripheral wall of each support hole or each pin shaft, and a plurality of escape recesses formed in the other of the peripheral wall of each support hole and each pin shaft so as to locationally correspond to the respective abutment portions. In the above-described hinge, when the pin shafts are inserted into the respective support holes, an alignment position is provided at which the abutment portions and the escape recesses are aligned with each other so that a clearance is defined between an entire circumference of each pin shaft and the corresponding escape recess, and an abutment position is provided at which said two members are rotated relative to each other from the alignment position by a predetermined angle so that at least two of the abutment portions are abutted against the peripheral wall of each support hole or the outer wall of each pin shaft.

According to the above-described hinge, a clearance is ensured around each pin shaft when each pin shaft is inserted in the corresponding support hole. Consequently, the pin shafts can readily be inserted into the respective support holes. The abutment portions are abutted against the peripheral wall of each support hole when the two members are rotatively moved by the predetermined angle relative to each other. Consequently, the pin shafts can be prevented from shaking when the two members are rotatively moved.

The abutment portions are preferably equiangularly disposed on the peripheral wall of each pin shaft. In this construction, the pin shafts can be prevented from being urged in any direction to thereby shake.

A tubular member is held between the two members. The two members are rotatively moved between an open position where the tubular member is allowed to be detached and attached and a closed position where the tubular member is prevented from being detached. The abutment portions, and the outer wall of each pin shaft or the peripheral wall of each support hole are located at the abutment position when the two members are at the closed position. When the tubular member is attached by the hinge so as to be located at the closed position, the pin shafts and the support holes assume the abutment position where the shaking of the pin shafts is prevented. Consequently, the tubular member can stably be held by the hinge without shaking.

The two members preferably have respective engagement portions engaged with each other when located at the closed position. Consequently, the tubular member can reliably be held by the hinge.

The abutment position is preferably provided when the two members are located at least at each of the open and closed positions. Each pin shaft and the corresponding support hole also assume the abutment position when the hinge is located at the open position. Consequently, the shaking of the pin shafts can be prevented when the hinge occupies the open position.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENT

Figure 1:
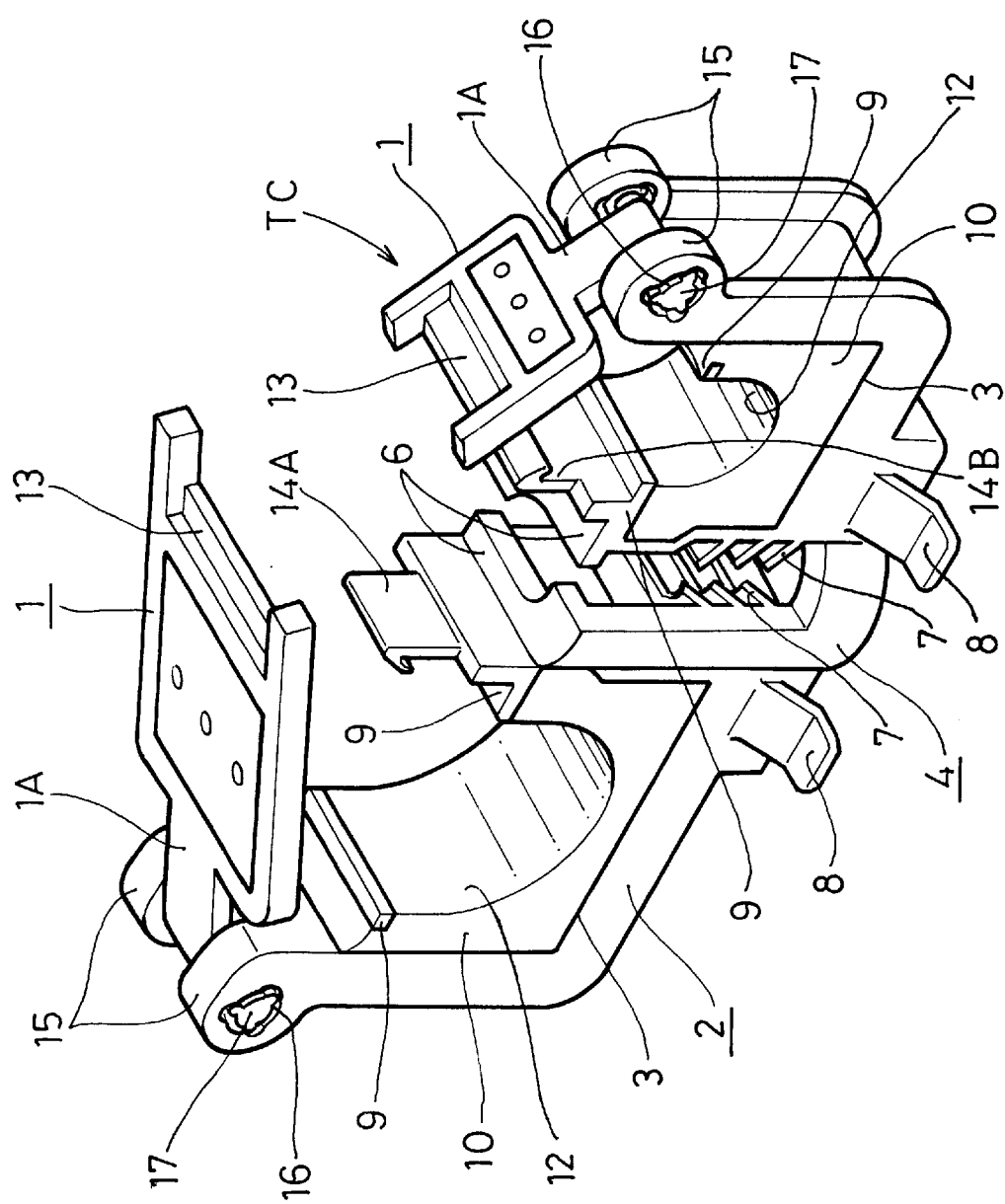
FIG. 1 is a perspective view of a tube clamp of one embodiment in accordance with the present invention.

One embodiment of the present invention will be described with reference to FIGS. 1 to 7 of the accompanying drawings. Referring to FIG. 1, an overall tube clamp TC to which the invention is applied is shown. The tube clamp TC is provided to hold metal tubes T used for tubing in automobiles. The tube clamp TC comprises two members formed using a single metal mold in a connected state, namely, a clamp body 2 and two presser lids 1. Each of these members is generally made of a hard resin such as polyacetal resin except for portions designated by reference numerals 10 and 18. These portions 10 and 18, provided for holding the tubes T therebetween, are made by stacking laminations of a soft resin such as an elastomer by way of insert molding.

Figure 2:
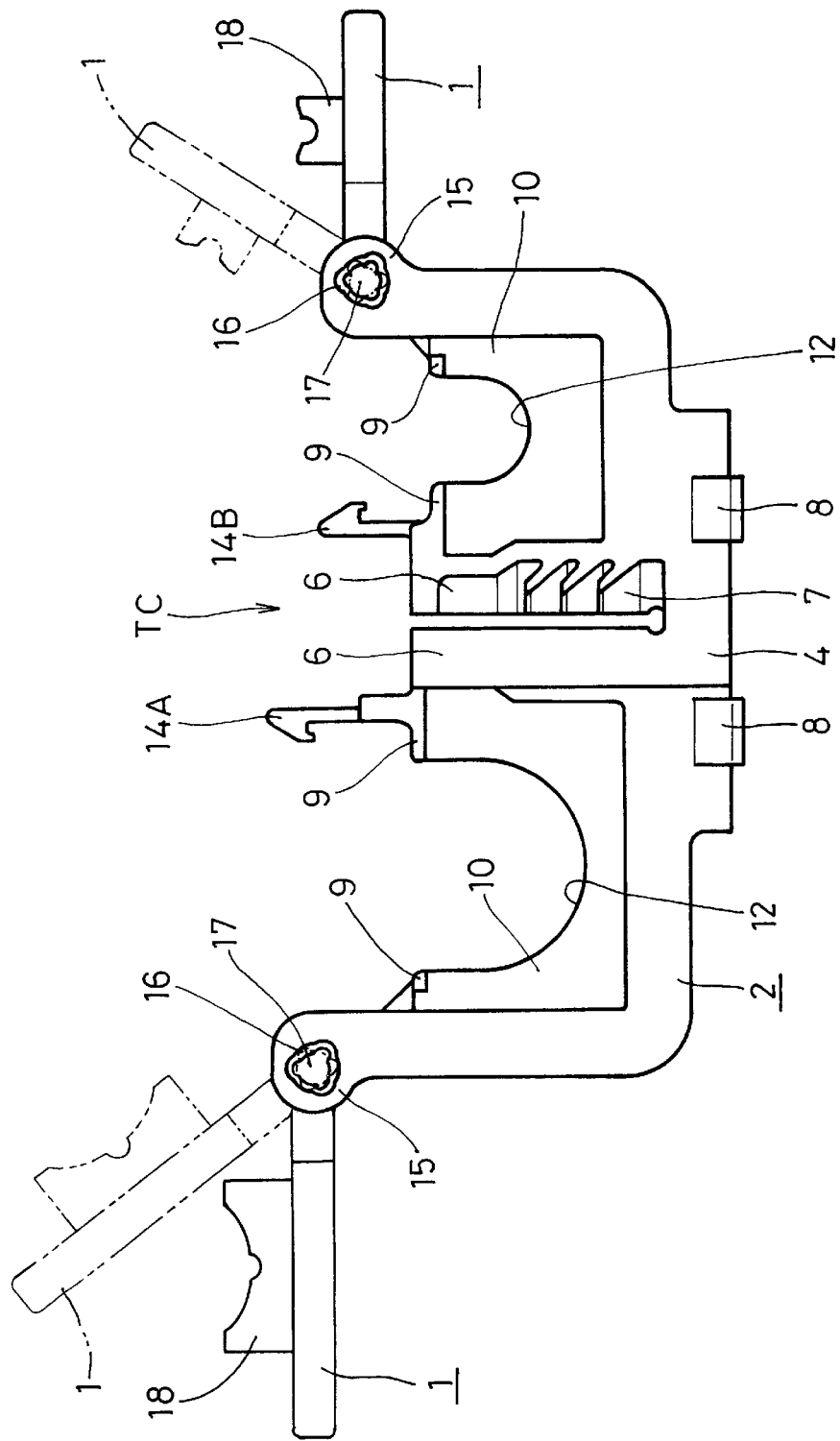
FIG. 2 is a front view of the tube clamp when the presser lid is opened.
Figure 3:
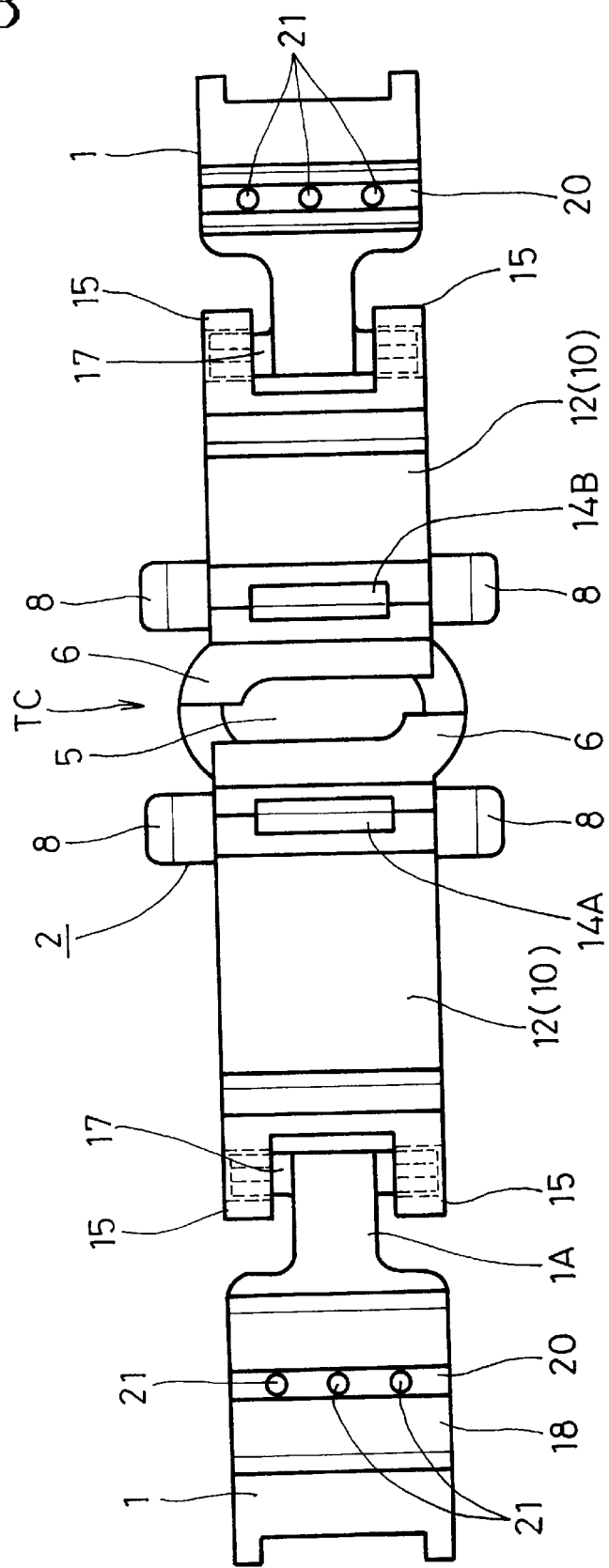
FIG. 3 is a plan view of the tube clamp when the presser lid is opened.

The clamp body 2 will first be described in detail. The clamp body 2 includes two tube holding sections 3 for holding two tubes T having different diameters, respectively. The clamp body 2 further includes a securing section 4 provided between the holding sections 3. The tube clamp TC is fixed at the securing section 4 to a body panel B of the automobile (shown only by two-dot chain line in FIG. 7). An elongated insertion hole 5 is open at a backside of the securing section 4. A pair of support pieces 6 stand so as to surround the insertion hole 5. The support pieces 6 are assembled into a generally cylindrical shape with an elliptic horizontal section. A stud bolt SB (shown only in FIG. 7) stands from the body panel B. In order that the clamp body 2 may be mounted on the body panel B, the stud bolt SB is inserted into the insertion hole 5 to be held between the support pieces 6. The support pieces 6 have opposite faces formed with a plurality of vertically aligned fall-off preventing claws 7 which are engaged with the stud bolt SB, respectively, as shown in FIGS. 1 and 2. Upper and lower ends of the support pieces 6 are open in order that the claws 7 may formed, as shown in FIG. 3. The claws 7 are formed to extend obliquely upward over the entire width of each support piece 6 and to be flexible, as shown in FIG. 1. The claws 7 of one support piece 6 are formed at intervals equal to, but out of phase with, those of the claws 7 of the other support 6. Accordingly, the fall-off preventing claws 7 of at least either one support piece 6 are engaged with the stud bolt SB.

Four legs 8 protrude obliquely downward and then outward from the lower opposite sides of the clamp body 2 outside the securing section 4, as shown in FIGS. 1 to 3. When the tube clamp TC is mounted on the body panel B, the legs 8 are abutted against the body panel B. As a result, the tube clamp TC is stably mounted on the body panel B.

Figure 7:
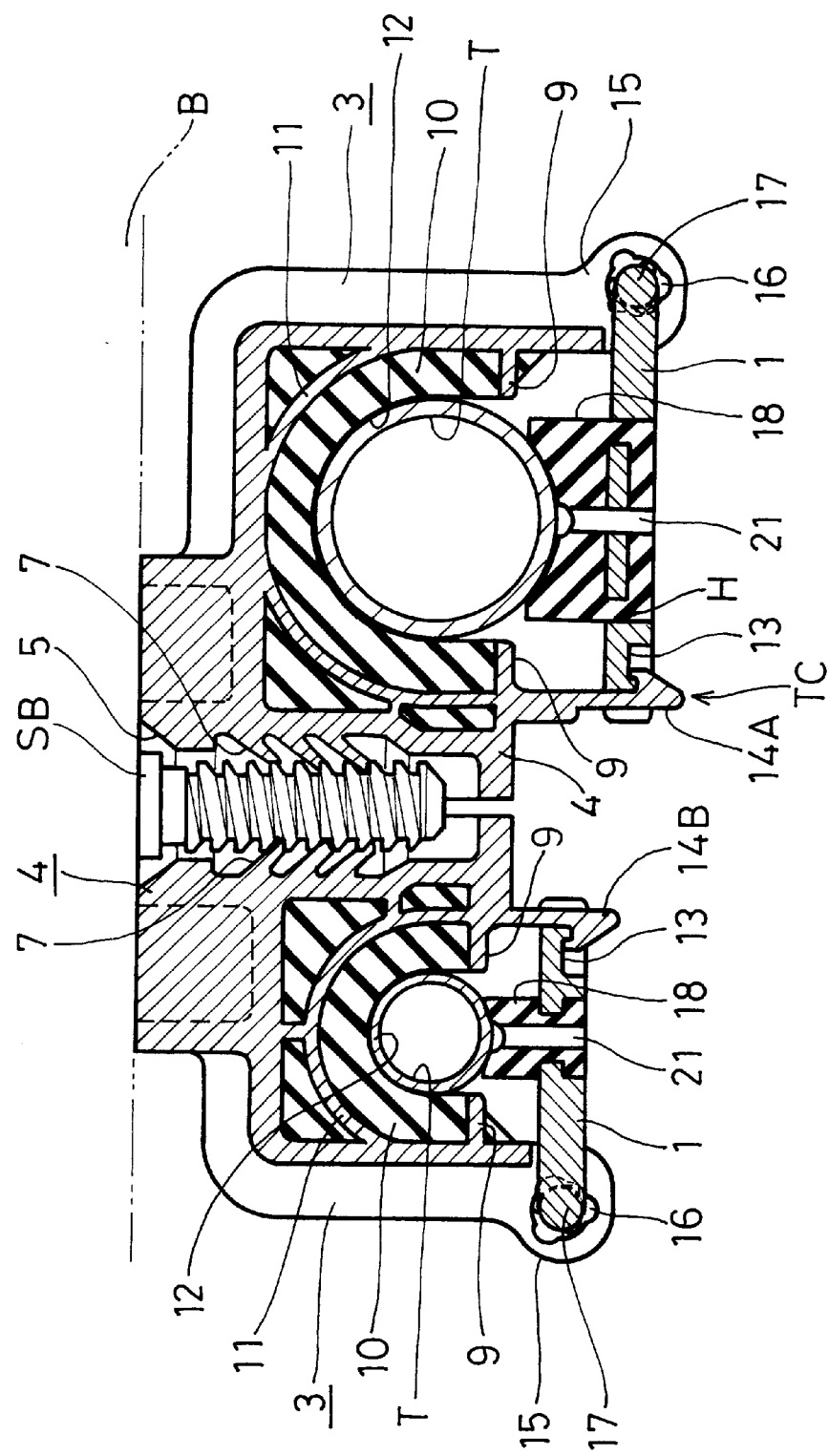
FIG. 7 is a sectional view of the tube clamp with two tubes being clamped.
Figure 8:
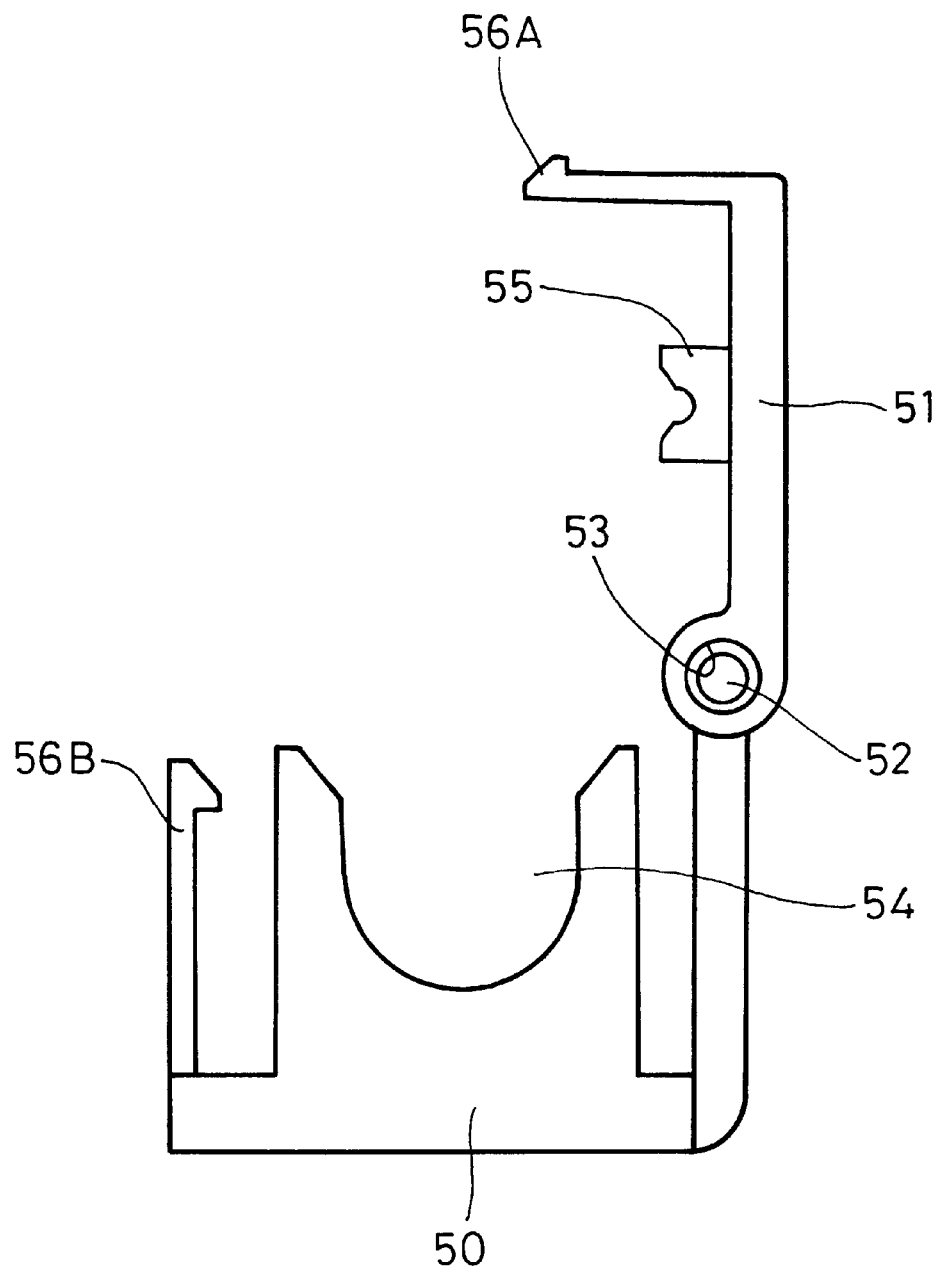
FIG. 8 is a front view of a conventional tube clamp.
Figure 9:
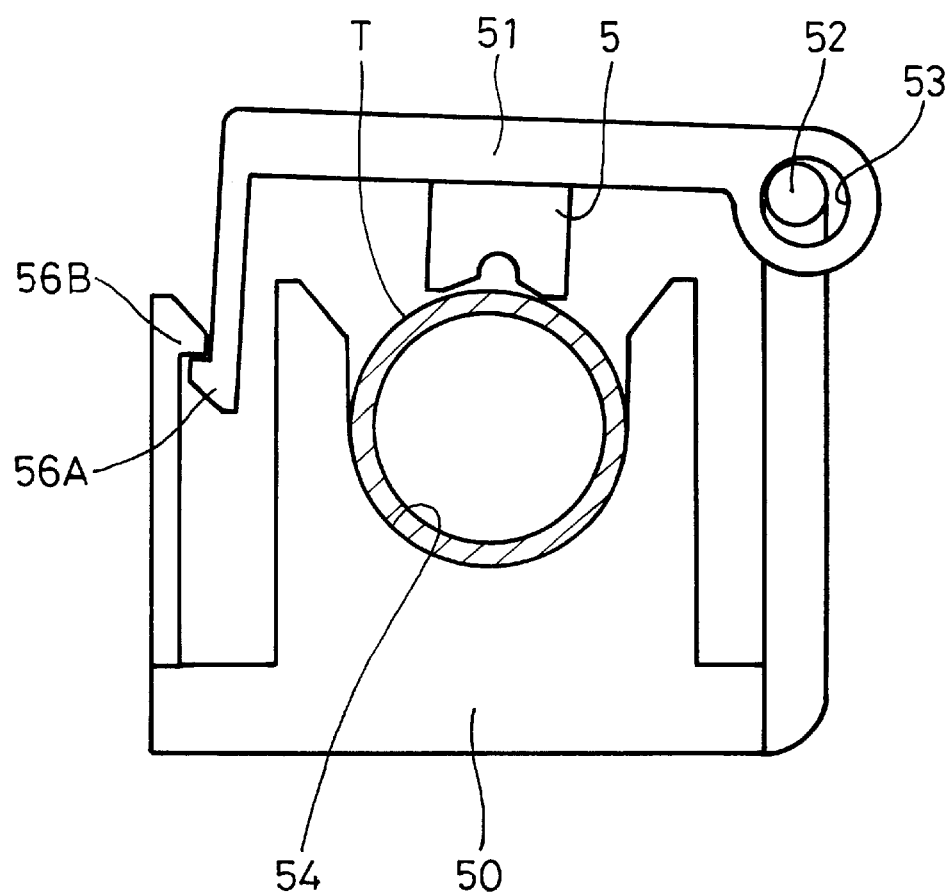
FIG. 9 is a sectional view of the conventional tube clamp when the presser lid is closed.

The clamp body 2 includes two portions for holding the respective tubes T. These holding portions have dimensions different from each other and open at upper ends and opposite sides. Each holding portion has a squarish C-shaped section. Two flanges 9 extend from the respective upper edges of each C-shaped section so as to be opposed to each other. A support portion 10 made of the soft resin by the insert molding is stacked on the inside of each C-shaped portion. The material of each support portion 10 differs from that of the clamp body 2 and has a low adhesiveness with respect to that of the clamp body 2. Accordingly, a mechanical bonding force needs to be applied to each support portion 10 and the clamp body 2 to ensure a bonding strength therebetween. In the embodiment, several bridging pieces 11 are provided inside each C-shaped portion as shown in FIG. 7. The fluid soft resin penetrates to the backside of each bridging piece 11 during formation of the support portions 10. Furthermore, the support portions 10 are pressed by the flanges 9. A holding groove 12 is formed at the upper side of each support portion 10 for holding each tube T. Each holding groove 12 has a curvature suitable for an outer circumference of the tube T. More specifically, each holding groove 12 desirably has a curvature slightly larger than the outer circumference of the tube T so as to be pressed against the outer circumference of the corresponding tube T. Each holding groove 12 has such a depth that an upper part of the corresponding tube T is located outside the groove and that the center of the tube T is located at the same level, as shown in FIG. 7.

Figure 6:
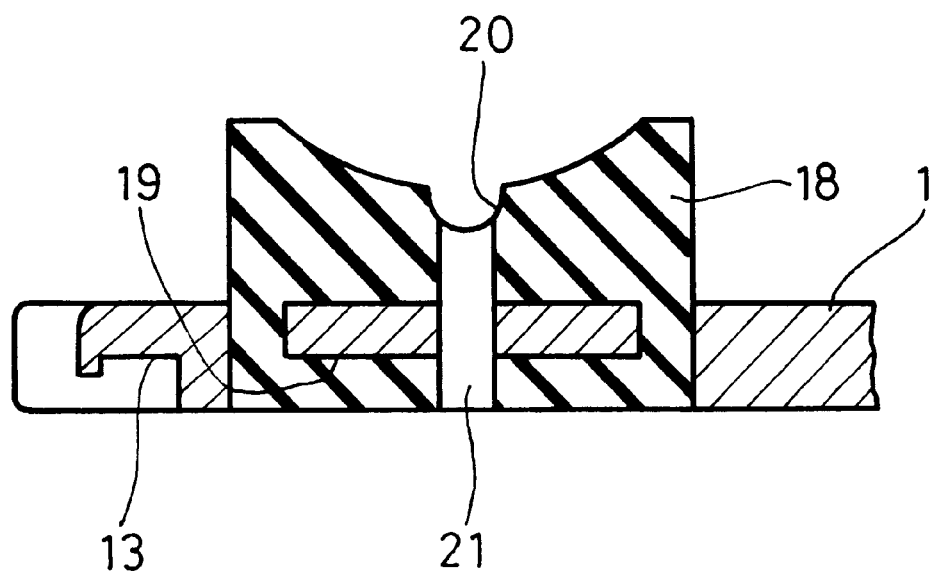
FIG. 6 is a sectional view of the presser lid.

The presser lids 1 will now be described. The presser lids 1 are mounted on the outer open edges of the tube holding sections 3 by hinges to be opened and closed, respectively. Each presser lid 1 is rotatively moved between an open position where the tube T is attached to and detached from the holding groove 12 and a closed position where the tube T is held in the holding groove 12 to be prevented from being detached therefrom. Each presser lid 1 has a free end formed with an engagement edge 13, as shown in FIG. 6. Engagement claws 14A and 14B are formed to stand from the inner open edges of the tube holding sections 3 so as to conform with the diameters of the large and small tubes T to be attached to the holding sections, respectively. The engagement claws 14A and 14B are directed to the opposite presser lids 1 and elastically deformable. When each presser lid 1 is closed, the engagement claw 14A or 14B is engaged with the engagement edge 13 so that the rotative movement of each presser lid 1 and clamp body 2 is prevented.

Pressing members 18 made of the same soft resin as the support members 10 are stacked on the inner surfaces of the presser lids 1, respectively. The pressing members 18 press upper portions of the tubes T when the presser lids 1 are rotatively moved to the closed positions, respectively. Depressions 19 are formed in the faces of the presser lids 1 opposed to the pressing members 18 respectively, as shown in FIG. 6. The surfaces at the pressing members 18 have holes H communicating with the depressions 19 respectively. The soft resin penetrates through the holes H into the opposite faces of the presser lids 1 when the pressing members 18 are formed. Consequently, a sufficient bonding strength can be ensured between the presser lids 1 and the pressing members 18.

An upper face of each pressing member 18 opposite the tube T is formed into an arcuate shape conforming to the outer circumference of the tube T, as shown in FIG. 6. A trough groove 20 extending in the direction of width of the presser lid 1 is formed in the lowermost portion of the arcuate face of each presser lid 1, as shown in FIG. 3. Each trough groove 20 has three drain holes 21 formed to communicate with the opposite side of the presser lid 1. For example, in the case where condensed water adheres to the tube T when the tubes T are used for tubing for an automobile air conditioner, the condensed water is discharged through the drain holes 21 so that the tube T is prevented from rusting. In the embodiment, the tube clamp TC is mounted on the body panel B with the presser lids 1 being directed downward as shown in FIG. 7.

Hinge portions of the tube clamp will now be described. Since the hinge portions of the respective tube holding sections 3 have the same construction, only the hinge portion of the left-hand tube holding section 3 for the large diameter tube T will be described as viewed in FIG. 1.

Figure 4:
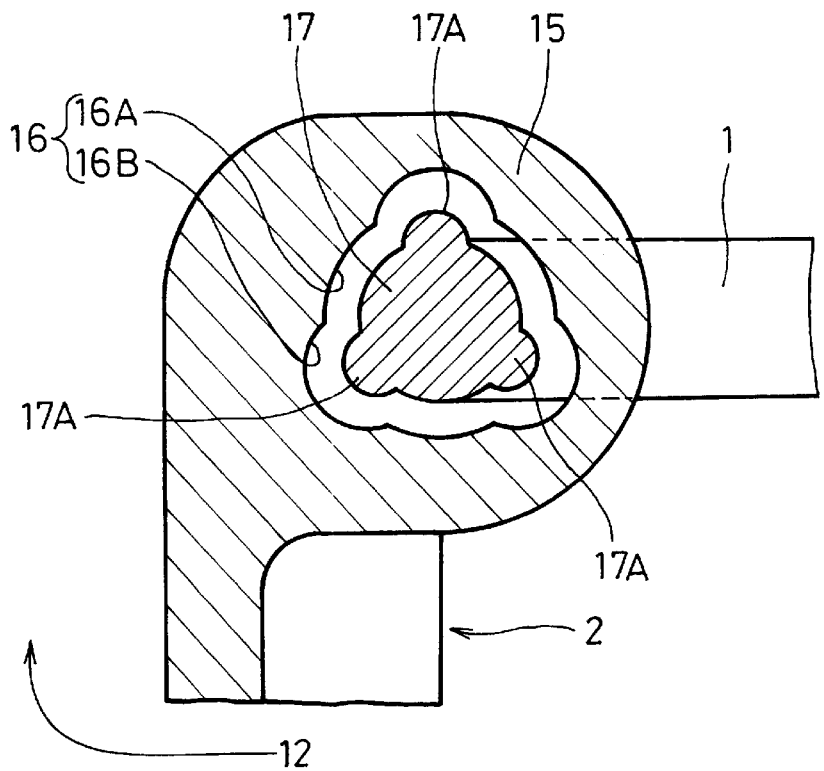
FIG. 4 is an enlarged sectional view of a hinge section during forming, showing the open state of the presser lid.

A pair of supports 15 are formed at the outer opening edge of the tube holding section 3 so as to align with each other in the direction of an axis of the tube T to be held. The supports 15 have support holes 16 formed therethrough to extend in the direction of axis of the tube T. The presser lid 1 has a narrow portion 1A held between the supports 15. The narrow portion 1A has a pair of pin shafts 17 protruding therefrom in opposite directions. The pin shafts 17 are inserted into the support holes 16 of the supports 15 respectively. Each presser lid 1 and the clamp body 2 are simultaneously formed as mentioned above. As shown in FIG. 2, each presser lid 1 is maintained in the horizontal state during the forming. Each support hole 16 has a base circle 16A with a predetermined diameter as shown in FIG. 4. The base circle 16A of each support hole 16 has three escape portions 16B formed to be radially depressed into arcuate shapes at intervals of central angles of about 120 degrees. Each pin shaft 17 has a proximal portion with an outer diameter set to be sufficiently smaller than the diameter of the base circle 16A of the support hole 16. Each pin shaft 17 has three radially protruding abutment portions 17A formed on the outer circumference of the proximal portion thereof at intervals of about 120 degrees. In the forming, each presser lid 1 and the clamp body 2 are positioned so that the abutment portions 17A are aligned with the escape portions 16B, respectively, as shown in FIG. 4. This positional relationship will hereinafter be referred to as "alignment position." When the abutment portions 17A and the escape portions 16B are located at the alignment position, a substantially uniform clearance is defined between an overall outer periphery of the pin shaft 17 including the abutment portions 17A and an overall inner periphery of the support hole 16. This clearance ensures die cutting for forming the pin shafts 17 and the support holes 16.

When the presser lid 1 is rotated from the position in the forming about 180 degrees to assume the closed position, each abutment portion 17A is positioned on a portion of the base circle 16A, or more specifically, on the middle portion thereof between the escape portions 16B. The distance between the center of each pin shaft 17 and the distal end of each abutment portion 17A is set to be slightly longer than a radius of the base circle 16A. As a result, each abutment portion 17A is abutted against the periphery of the base circle 16A such that the presser lid 1 can be prevented from shaking. This position at which the abutment portions 17A are abutted against the periphery of the base circle 16A will hereinafter be referred to as "abutment position." In the embodiment, the support hole 16 and pin shaft 17 have three abutment positions, namely, those provided when the presser lid 1 and the clamp body 2 assume the closed and open positions, and the other provided when the presser lid 1 is rotated about 240 degrees from the closed position toward the open position.

The holding of the tubes T by the above tube clamp will now be described. First, the tube clamp TC is mounted on the body panel B. The insertion hole 5 of the securing section 4 is aligned with the distal end of the stud bolt SB. The tube clamp TC is strongly thrust against the body panel B so that the stud bolt SB is inserted into the cylindrical space defined between the support pieces 6 with the fall-off preventing claws 7 being flexed. When the tube clamp TC is thrust until the bottom of the securing section 4 is abutted against the body panel B, the stud bolt SB is engaged with the claws 7 such that the tube clamp TC is fixed on the body panel B. Since the legs 8 are abutted against the body panel B, the tube clamp TC fixed on the body panel B is prevented from shaking.

The tubes T are held on the tube clamp TC after the latter has been fixed on the body panel B. Both presser lids 1 are opened so that the support portions 10 of the holding sections 3 assume the open positions as shown by two-dot chain line in FIG. 2. Thus, the abutment portions 17A of each pin shaft 17 are abutted against the periphery of the base circle 16A of the support hole 16, whereupon each pin shaft 17 assumes the abutment position. Consequently, since the presser lids 1 are prevented from shaking even when the tube clamp TC is directed downward, the tubes T can smoothly be attached to the tube clamp TC.

Each tube T is aligned with the holding groove 12 and then fitted thereinto. The engagement edges 13 are engaged with the engagement claws 14A and 14B when the presser lids 1 are rotated to the closed positions, respectively. The tubes T are held between the pressing portions 18 of the presser lids 1 and the support portions 10, respectively. Both tubes T are fixed approximately at the same level from the body panel B when held in the tube holding sections 3, respectively as described above, respectively. Although the tubes T are held on the tube clamp TC after the tube clamp is fixed on the body panel B, in the foregoing description, the tube clamp TC may be fixed on the body panel B after the tubes T are held on the tube clamp TC.

The hinge for each presser lid 1 employs a characteristic structure in the embodiment. More specifically, the abutment portions 17A of each pin shaft 17 are aligned with the escape portions 16B in the forming of the tube clamp TC, as shown in FIG. 4, so that the uniform clearance is defined about the entire circumference of the pin shaft 17. As a result of this clearance, a forming die for forming the support shafts 16 and the pin shafts 17 can be inserted and drawn out in the direction of axis of the pin shaft 17 or support hole 16. Consequently, the two members, namely, the presser lids 1 and the clamp body 2, can be formed in their connected state. On the other hand, work for the connection is necessitated when the two members are independently formed and then combined together. However, the foregoing embodiment requires no work for the connection.

Figure 5:
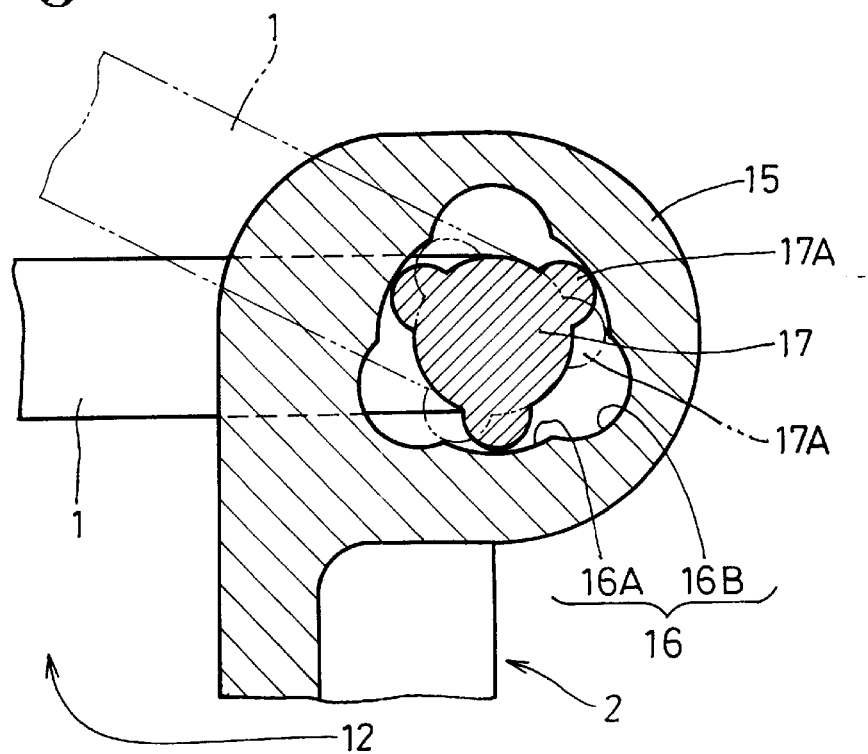
FIG. 5 is an enlarged sectional view of the hinge section when the presser lid is in the closed state.

Each abutment portion 17A assumes the abutment position where each abutment portion is abutted against the periphery of the base circle 16A of the support hole 16 when each presser lid 1 is angularly displaced by the predetermined angle. When each abutment portion 17A assumes the abutment position, each pin shaft 17 is held by frictional forces between each abutment portion 17A and the periphery of the base circle 16A, so that each presser lid 1 is prevented from shaking. As shown in FIG. 5, when each tube T is pressed by the presser lid 1 at the closed position, each pin shaft 17 assumes the abutment position, whereupon the presser lid 1 is prevented from shaking. As a result, each tube T is stably held by the tube clamp TC. Furthermore, when each tube T is fitted into the holding groove 12 too, each presser lid 1 is opened so as to assume the abutment position where the abutment portions 17A are abutted against the inner periphery of the base circle 16A. Consequently, each presser lid 1 can be prevented from being inadvertently closed and each tube T can smoothly be fitted into the holding groove 12. Additionally, an inadvertent engagement between the edges 13 and the respective claws 14A and 14B can be prevented during transportation of the tube clamps TC when each presser lid 1 is held at the abutment position before the tubes T are held by the tube clamp TC. As a result, a troublesome working for disengaging the edges 13 from the claws 14A and 14B can be avoided.

Although the presser lids 1 and the clamp body 2 are integrally formed in the foregoing embodiment, these parts may be formed separately and subsequently combined together. Furthermore, in the foregoing embodiment, each pin shaft 17 is formed with the abutment portions 17A and each support hole 16 is formed with the escape portions 16B. On the other hand, each pin shaft 17 may have the escape portions 16B and each support hole 16 may have the abutment portions 17A. The configuration, number and arrangement of the abutment and escape portions 17A and 16B should not be limited to those shown by the drawings. For example, each pin shaft 17 may have a triangular section and each support hole 16 may be formed into a triangular shape conforming to the triangular pin shaft 17. Moreover, each pin shaft 17 may have a square section. Thus, each abutment portion 17A and each escape portion 1 6B may be formed into any shapes provided that a clearance is defined between the pin shaft 17 and the inner periphery of the support hole 16 when the pin shaft 17 is inserted in the support hole 16 and that portions of the pin shaft 17 are abutted against the inner periphery of the support hole 16 when the pin shaft 17 is rotated relative to the support hole 16.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A hinge which includes two members rotatably connected together, comprising:
   a pair of pin shafts protruding from either one of the two members, each pin shaft having an outer wall;
   a pair of support holes formed in the other member, the pin shafts being inserted into the respective support holes so that the two members are rotatable relative to each other, each support hole having a peripheral wall;
   a plurality of abutment portions protruding from either one of the peripheral wall of each support hole or each pin shaft; and
   a plurality of escape recesses formed in the other of the peripheral wall of each support hole and each pin shaft so as to locationally correspond to the respective abutment portions;
   wherein when the pin shafts are inserted into the respective support holes, an alignment position is provided at which the abutment portions and the escape recesses are aligned with each other so that a clearance is defined between an entire circumference of each pin shaft and the corresponding escape recess, and an abutment position is provided at which said two members are rotated relative to each other from the alignment position by a predetermined angle so that at least two of the abutment portions are abutted against the peripheral wall of each support hole or the outer wall of each pin shaft.

2. A hinge of claim 1 wherein the abutment portions are equiangularly disposed on the peripheral wall of each pin shaft.

3. The hinge of claim 2, wherein:
   said two members are rotatively movable between an open position for allowing a tubular member to be detached from and attached to the hinge and a closed position for, when the tubular member is attached, preventing the tubular member from being detached from the hinge; and
   the outer wall of each pin shaft or the peripheral wall of each support hole is located at the abutment position when the two members are at the closed position.

4. A hinge of claim 3 wherein said two members have respective engagement portions engaged with each other when located at the closed position.

5. A hinge of claim 4 wherein the abutment position is provided when said two members are located at least at each of the open and closed positions.

6. A hinge of claim 3 wherein the abutment position is provided when said two members are located at least at each of the open and closed positions.

7. The hinge of claim 1, wherein:
   said two members are rotatively movable between an open position for allowing a tubular member to be detached from and attached to the hinge and a closed position for, when the tubular member is attached, preventing the tubular member from being detached from the hinge; and
   the outer wall of each pin shaft or the peripheral wall of each support hole is located at the abutment position when the two members are at the closed position.

8. A hinge of claim 7 wherein said two members have respective engagement portions engaged with each other when located at the closed position.

9. A hinge of claim 8 wherein the abutment position is provided when said two members are located at least at each of the open and closed positions.

10. A hinge of claim 7 wherein the abutment position is provided when said two members are located at least at each of the open and closed positions.

* * * * *